United States Patent
Liang et al.

(10) Patent No.: US 11,973,225 B2
(45) Date of Patent: Apr. 30, 2024

(54) LITHIUM METAL PHOSPHATE ELECTRODE MANUFACTURING

(71) Applicant: Rivian IP Holdings, LLC, Irvine, CA (US)

(72) Inventors: Guoxian Liang, St-Bruno-de-Montarville (CA); Majid Talebiesfandarani, Emeryville, CA (US); Cary Michael Hayner, Naperville, IL (US); Ki Tae Park, Santa Clara, CA (US); Victor Prajapati, San Francisco, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 3 days.

(21) Appl. No.: 17/937,963

(22) Filed: Oct. 4, 2022

(65) Prior Publication Data
US 2024/0113295 A1  Apr. 4, 2024

(51) Int. Cl.
*H01M 4/58* (2010.01)
*C01B 25/30* (2006.01)
*C01B 25/45* (2006.01)
*C22B 7/00* (2006.01)
*C22B 26/12* (2006.01)
*H01M 10/54* (2006.01)

(52) U.S. Cl.
CPC ......... *H01M 4/5825* (2013.01); *C01B 25/301* (2013.01); *C01B 25/308* (2013.01); *C01B 25/45* (2013.01); *C22B 7/001* (2013.01); *C22B 26/12* (2013.01); *H01M 10/54* (2013.01); *H01M 2220/20* (2013.01)

(58) Field of Classification Search
CPC ..... C01B 24/301; C01B 25/308; C01B 25/45; C22B 7/001; C22B 25/12
See application file for complete search history.

(56) References Cited

U.S. PATENT DOCUMENTS

2018/0097228 A1\* 4/2018 Tan ................... C01B 25/451

FOREIGN PATENT DOCUMENTS

| CN | 107151746 A | \* | 9/2017 | |
|---|---|---|---|---|
| CN | 108862335 A | \* | 11/2018 | ............ C01D 15/08 |
| CN | 110233306 A | \* | 9/2019 | |
| CN | 111254276 A | \* | 6/2020 | |
| CN | 112047335 A | \* | 12/2020 | |
| CN | 112646976 A | \* | 4/2021 | ............ C22B 23/043 |
| WO | WO-2019160982 A1 | \* | 8/2019 | ............ B01D 15/362 |

OTHER PUBLICATIONS

RD-696070-A, Mar. 2022, RD, Name not available.\*

\* cited by examiner

*Primary Examiner* — Melissa S Swain
(74) *Attorney, Agent, or Firm* — BAKERHOSTETLER

(57) ABSTRACT

Described are embodiments of a lithium metal phosphate production methods and systems. The systems and methods can include combining lithium extraction from spodumene, lithium recycling from lithium ion battery ("LIB") black mass, and/or lithium metal phosphate synthesis from metal phosphates.

20 Claims, 10 Drawing Sheets

LITHIUM METAL PHOSPHATE ELECTRODE MANUFACTURING

INTRODUCTION

This disclosure relates generally to batteries and methods of preparing batteries, and more specifically, to lithium metal phosphate manufacturing systems and methods of using such lithium metal phosphate to prepare batteries.

BRIEF SUMMARY

Lithium metal phosphate, in particular iron-containing lithium metal phosphates, electrodes are typically produced by mixing iron phosphate with lithium carbonate followed by a solid-state reaction. The iron phosphate phase and lithium carbonate are normally produced from separate processes and each of these processes have their own waste stream to be treated, thereby adding additional costs. In addition, lithium carbonate is also expensive to use as a raw material for lithium metal phosphate production.

Disclosed herein are systems and processes of producing lithium metal phosphate, for example lithium iron phosphate ("LFP") and/or lithium manganese iron phosphate ("LMFP"). More specifically, the systems and processes disclosed herein can include lithium extraction, lithium metal phosphate synthesis, and lithium ion battery ("LIB") recycling to achieve synergy and/or reduce cost.

In some embodiments, a method includes forming a metal phosphate and a solution comprising lithium sulfate; precipitating lithium phosphate from the solution using a phosphate-containing material; mixing the metal phosphate with the lithium phosphate to form a lithium metal phosphate precursor; and processing the lithium metal phosphate precursor to form lithium metal phosphate. In some embodiments, processing comprising: milling the lithium metal phosphate precursor, calcining the lithium metal phosphate precursor, or combinations thereof. In some embodiments, wherein the lithium metal phosphate comprises lithium iron phosphate (LFP), lithium iron manganese phosphate (LMFP), or combinations thereof. In some embodiments, the metal phosphate comprises ferric phosphate, ferrous phosphate, manganous phosphate, manganese phosphate, manganese iron phosphate, or combinations thereof. In some embodiments, the method includes mixing the metal phosphate with an iron source. In some embodiments, the iron source comprises iron oxalate, iron citrate, iron oxide, or a combination thereof. In some embodiments, the lithium metal phosphate precursor is calcined between 550-750° C. for 2-12 hours. In some embodiments, the phosphate-containing material comprises sodium phosphate, phosphoric acid, sodium hydroxide, or a combination thereof. In some embodiments, the method includes roasting spodumene, leaching the roasted spodumene with sulfuric acid to obtain a second solution comprising lithium sulfate, and combining the first solution and the second solution comprising lithium sulfate prior to precipitating lithium phosphate using the phosphate-containing material. In some embodiments, forming the metal phosphate and the solution comprising lithium sulfate comprises extracting lithium from lithium ion battery black mass, wherein extracting lithium from lithium ion battery black mass comprises reacting lithium ion battery black mass with an oxidizing gas. In some embodiments, the oxidizing gas comprises NOx, $Cl_2$, or $SO_x$. In some embodiments, the reaction of lithium ion battery black mass with $SO_x$ forms ferric phosphate, lithium sulfate, or combinations thereof. In some embodiments, forming the metal phosphate and the solution comprising lithium sulfate comprises extracting lithium from lithium ion battery black mass, wherein extracting lithium from lithium ion battery black mass comprises leaching the lithium ion battery black mass with sulfuric acid and hydrogen peroxide or oxygen gas to form at least the metal phosphate. In some embodiments, the method includes dissolving the metal phosphate with sulfuric acid, and adjusting a ratio of iron to phosphate, a ratio of manganese to phosphate, an oxidation state of iron, an oxidation state of manganese, or a combination thereof in the dissolved metal phosphate solution. In some embodiments, the ratio of iron to phosphate, the ratio of manganese to phosphate, the oxidation state of iron, the oxidation state of manganese, or a combination thereof is adjusted using iron, manganese, manganese sulfate, iron sulfate, or combinations thereof. In some embodiments, the method includes precipitating ferric phosphate, ferrous phosphate, manganous phosphate, manganese phosphate, manganese iron phosphate, or combinations thereof from the dissolved metal phosphate. In some embodiments, the method includes spray drying the milled mixture.

In some embodiments, a method includes precipitating lithium phosphate from a first solution comprising lithium sulfate using a phosphate-containing material; mixing ferric phosphate, ferrous phosphate, manganous phosphate, manganese phosphate, manganese iron phosphate, or combinations thereof with the lithium phosphate to form a lithium metal phosphate precursor; milling the lithium metal phosphate precursor; and calcining the lithium metal phosphate precursor to form lithium iron phosphate (LFP), lithium iron manganese phosphate (LMFP), or a combination thereof. In some embodiments, the method includes recycling lithium ion battery black mass by reacting lithium ion battery black mass with an oxidizing gas comprising NOx, $Cl_2$, or $SO_x$ to form the ferric phosphate, ferrous phosphate, manganous phosphate, manganese phosphate, manganese iron phosphate, or combinations thereof and the lithium sulfate; and mixing the lithium sulfate with a solvent to form the first solution comprising lithium sulfate.

In some embodiments, a method includes mixing ferric phosphate, ferrous phosphate, manganous phosphate, manganese phosphate, manganese iron phosphate, or combinations thereof with a lithium phosphate at a stoichiometric ratio to form a lithium metal phosphate precursor; milling the lithium metal phosphate precursor; and calcining the lithium metal phosphate precursor to form lithium iron phosphate (LFP), lithium iron manganese phosphate (LMFP), or combinations thereof.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to methods, systems, and electrode materials, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

In the Figures, like reference numerals refer to like components unless otherwise stated herein.

DETAILED DESCRIPTION

Examples of lithium metal phosphates include lithium iron phosphate ("LFP"), lithium iron manganese phosphate ("LFMP"), or combinations thereof. Lithium iron phosphate can be manufactured through many different processes such as solid-state reactions of $FePO_4$ and $Li_2CO_3$ at elevated temperatures in the presence of a reducing agent. LFP can also be synthesized by hydrothermal reactions of $FeSO_4$, $H_3PO_4$, and LiOH at mild temperatures under pressure. A third method of producing LFP is a sol-gel process where LFP is formed from mixing Fe, $PO_4$, and Li sources (e.g., Fe nitrate, $H_3PO_4$, and LiOH) in liquid form followed by calcination at elevated temperatures.

Described herein is a lithium metal phosphate production system and process that can synergize lithium metal phosphate production, lithium extraction, and lithium ion battery recycling. Typical lithium extraction from spodumene includes roasting spodumene concentrate at high temperatures (~1000° C.), acid leaching the roasted spodumene with sulfuric acid to obtain a $Li_2SO_4$ solution, purifying the $Li_2SO_4$ solution to remove impurities (e.g., iron, aluminum, magnesium, calcium, etc.), further concentrating the solution, and then precipitating lithium carbonate through a complex process of evaporation and precipitation. The systems and methods disclosed herein can use lithium phosphate ($Li_3PO_4$) instead of lithium carbonate. Lithium phosphate has a much lower solubility than lithium carbonate and can therefore be precipitated easier without further concentration by evaporation, thereby saving energy and cost.

Figure 1:
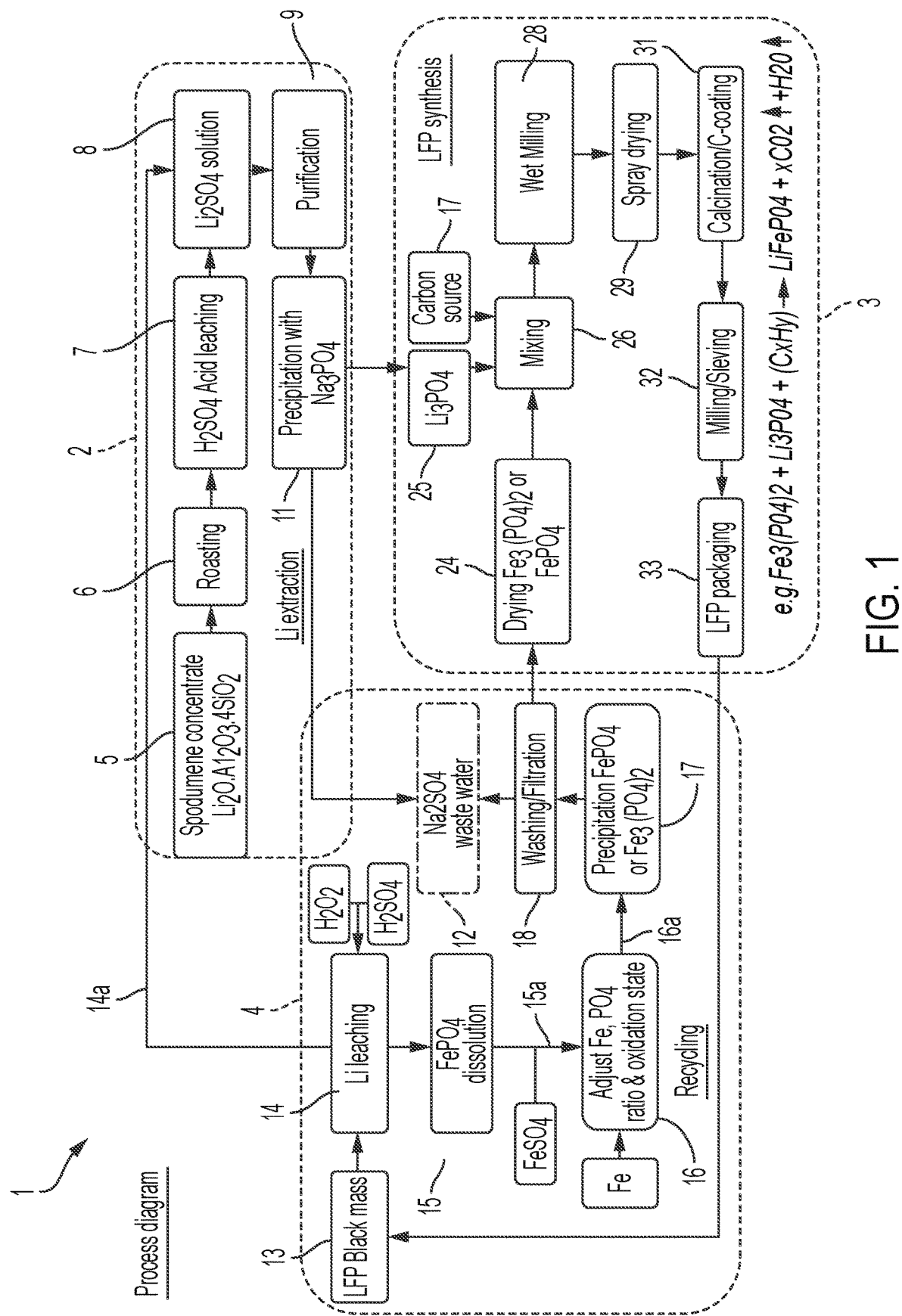
FIG. 1 illustrates an exemplary flowchart for a lithium metal phosphate production process in accordance with some embodiments disclosed herein.

FIG. 1 illustrates an exemplary flowchart for a lithium metal phosphate production process 1 in accordance with some embodiments disclosed herein. Specifically, the lithium metal phosphate can include a lithium extraction process 2, a lithium metal phosphate synthesis process 3, and/or a lithium ion battery ("LIB") black mass recycling process 4. In some embodiments, the lithium metal phosphate production process can be a closed loop integrated process. As described further herein, the lithium metal phosphate production process can extract new lithium salt (e.g., $Li_3PO_4$) from spodumene and use the salt as a source of lithium and/or phosphorous during synthesis of lithium metal phosphate. In addition, material from a used or spent LIB (i.e., black mass) can be recycled and reused in the lithium metal phosphate production process. Such an integrated lithium metal phosphate production process (i.e., lithium extraction, lithium metal phosphate synthesis, and LIB black mass recycling) can achieve greater synergy and cost reduction than typical lithium metal phosphate production processes.

In some embodiments, a lithium extraction process can include providing and/or obtaining 5 spodumene. In some embodiments, the spodumene can include lithium, aluminum, silicon, and/or oxygen. In some embodiments, the spodumene can be include $LiAl(SiO_3)_2$ and/or $Li2·O·Al_2O_3·4SiO_2$. In some embodiments, the spodumene can include natural impurities such as Fe, Mg, Ca, K, Na, or combinations thereof. In some embodiments, the spodumene can be a spodumene concentrate. In spodumene that includes $LiAl(SiO_3)_2$, the lithium content is theoretically about 3.75 wt. %, or about 8 wt. % $Li_2O$. In natural mineral occurrence, the lithium content is about 1-2 wt. %. Through mining beneficiation process, the Li2O content in the spodumene concentrate can increase by about 5-6 wt. %.

In some embodiments, the lithium extraction process can also include roasting 6 the spodumene. Roasting the spodumene can convert spodumene alpha phase to beta phase, which can more easily be dissolved by acid. In some embodiments, the spodumene can be roasted in a rotary kiln. In some embodiments, the spodumene can be roasted at a temperature of at least about 800° C., at least about 850° C., at least about 900° C., at least about 950° C., at least about 1000° C., or at least about 1050° C. In some embodiments, the spodumene can be roasted at a temperature of at most about 1200° C., at most about 1150° C., at most about 1100° C., at most about 1050° C., at most about 1000° C., or at most about 950° C. In some embodiments, the spodumene can be roasted at about 700-1300° C., about 750-1250° C., about 800-1200° C., about 850-1150° C., about 900-1100° C., about 950-1000° C., about 960-990° C., or about 970-980° C.

In some embodiments, the roasted spodumene can be leached 7 in the lithium extraction process. In some embodiments, the roasted spodumene can be leached with an acid to obtain an extraction solution 8 that includes a lithium salt. For extraction of lithium from spodumene, the process involving sulfuric acid has been commercially exploited. For extraction of lithium from spodumene, other processes are also possible, for example processes involving a mixture of calcium carbonate and/or calcium sulfate followed by water leaching. In some embodiments, the lithium salt can be lithium sulfate, lithium hydroxide, and/or lithium carbonate. In some embodiments, the acid can be sulfuric acid, HCl, $H_3PO_4$, or combinations thereof and the extraction solution can include lithium sulfate (e.g., $Li_2SO_4$). In some embodiments, the leaching is performed at a temperature of at least about 100° C., at least about 150° C., at least about 200° C., or at least about 250° C. In some embodiments, the leaching is performed at a temperature of at most about 400° C., at most about 350° C., at most about 300° C., or at most about 250° C. In some embodiments, the leaching is performed at a temperature of about 50-450° C., about 100-400° C., about 150-350° C., or about 200-300° C. In some embodiments, the acid excess for the reaction of spodumene and acid can be above 30%, but can be as high as 140%.

In some embodiments, the extraction solution formed from leaching can be purified in the lithium extraction process. In some embodiments, the purification of the extraction solution can include raising the pH of the extraction solution. In some embodiments, the pH can be raised to about 8-13.5, about 8.5-13, about 9-12.5, about 9.5-12, about 10-12, about 10.5-11.5 or about 11.

In some embodiments, the lithium extraction process includes precipitating 11 lithium phosphate from the extraction solution using a phosphate-containing material. The lithium phosphate can then be a raw material feedstock for the lithium metal phosphate synthesis process. In some embodiments, the phosphate-containing material can include sodium phosphate (e.g., $Na_3PO_4$), phosphoric acid, and/or sodium hydroxide. In some embodiments, precipitating lithium phosphate can create a waste 12. In some embodiments, the waste can include sodium sulfate ($Na_2SO_4$). In some embodiments, precipitating lithium phosphate from the extraction solution using a phosphate-containing material can be based on the following equation: $3Li_2SO_4 \cdot H_2O + 2H_3PO_4 + 6NaOh => 2Li_3PO_4 + 3Na_2SO_4$.

Typical lithium ion battery ("LIB") black mass recycling usually occurs through pyrometallurgy or hydrometallurgical processes. Lithium can be extracted in the hydrometallurgical process by acid leaching from LIB black mass. This can involve using acids and large amount of waste as well as the dissolution of undesired metals like Fe, Cu, Al into the lithium solution requiring further purification.

In some embodiments, a LIB black mass recycling process can include providing and/or obtaining 13 an LIB black mass. For example, a battery pack for recycling can be mechanically dismantled, crushed, and/or shredded. After the mechanical dismantling of the battery, some components such as plastics and aluminum can be filtered out. What remains is the black mass, which contains large quantities of the battery's active materials—such as LFP, LFMP, NCM or NCA, which contains lithium, iron, manganese, (nickel, cobalt for NCM cathodes). Black mass comprises high amounts of lithium, manganese, cobalt, and nickel metals. These metals can then be extracted.

In some embodiments, the LIB black mass is lithium metal phosphate (e.g., LFP or LMFP) black mass. The LIB black mass can be extracted from a used or spent LIB battery. In some embodiments, black mass can be dissolved (e.g., completely dissolved) in inorganic acid or mixed into solution, or lithium can be selectively leached by adding acids and/or oxidizing agents as described herein. In some embodiments, the LIB black mass recycling process can include extracting lithium from LIB black mass to form a metal phosphate (e.g., iron phosphate, ferric phosphate, ferrous phosphate, manganous phosphate, manganese phosphate, manganese iron phosphate, or combinations thereof) and/or a recycling solution. In some embodiments, the metal phosphate can be $MnHPO_4$, $MnPO_4$, $FeHPO_4$, $FePO_4$, $(Mn_{1-x}Fe_x)_3(PO_4)_2 \cdot xH_2O$, or combinations thereof. In some embodiments, this recycling solution can include lithium sulfate.

In some embodiments, a LIB black mass recycling process (i.e., extracting lithium from LIB black mass to form metal phosphate) can include leaching 14 the LIB black mass to form a leached solution. In some embodiments, the LIB black mass can be leached with an acid (e.g., sulfuric acid, $HNO_3$, and/or HCl) and/or an oxidizing agent (to suppress iron dissolution). In some embodiments, the oxidizing agent can be hydrogen peroxide and/or oxygen gas. In some embodiments, the leached solution can include a lithium salt (e.g., lithium sulfate, lithium hydroxide, lithium chloride, lithium nitrate, and/or lithium carbonate), an iron material, a manganese material, a phosphate material, a manganese phosphate material, an iron phosphate material, and/or an iron manganese phosphate material. For example, when extraction is performed by using inorganic acids like HCl or $HNO_3$, LiCl and/or $LiNO_3$ can be formed, but may be dissociated in the solution. In some embodiments, LiOH and/or $Li_2CO_3$ can be formed by adding NaOH and/or $Na_2CO_3$ at certain conditions.

In some embodiments, the leached solution can include iron phosphate, ferric phosphate, ferrous phosphate, manganous phosphate, manganese phosphate, manganese iron phosphate, or combinations thereof. In some embodiments, the leached solution can include $MnHPO_4$, $MnPO_4$, $FeHPO_4$, $FePO_4$, $(Mn_{1-x}Fe_x)_3(PO_4)_2 \cdot xH_2O$, or combinations thereof. In some embodiments, the iron material, a manganese material, a phosphate material, a manganese phosphate material, an iron phosphate material, and/or an iron manganese phosphate material may be a solid and/or residue in the leached solution.

The methods herein can be used for synthesis and/or recycling of phosphate-based cathode materials for lithium ion batteries. Various polyanionic olivine materials having formula $LiMPO_4$ (where M=Fe, Mn, Co, Ni, Zn or combinations thereof) with or without cationic substitution of other transition metals in the lattice can be synthesized and/or recycled by the methods described herein. This disclosure describes the synthesis lithium iron phosphate (LFP) and lithium manganese iron phosphate (LMFP) cathode materials for Lithium ion batteries (LIB s) as non-limiting examples. Other phosphate-based cathode materials (e.g., lithium iron phosphates, lithium manganese phosphates, lithium cobalt phosphates, lithium nickel phosphates, with or without cationic substitution of other transition metals in the lattice) can be similarly synthesized and/or recycled in accordance with the methods described herein.

In some embodiments, the lithium salt can be separated from the leached solution to form the recycled solution and this recycled solution 14a can be combined and/or mixed with the extraction solution 8 formed from leaching in the lithium extraction process 2. Normally, sulfuric acid can dissolve LIB black mass at a lower pH when iron is in Fe2+ state in LFP. Adding hydrogen peroxide and/or oxygen gas can keep the iron in the Fe3+ state at that pH. The Fe3+ can then combine with —$PO_4$ remaining as a solid/precipitate. This can allow for separation of the lithium salt from the metal phosphate material. Accordingly, lithium salt may not only be generated by extraction from spodumene, but also from recycled LIB black mass. In other words, the lithium salt solution from LIB recycling can be combined with a lithium salt solution from the lithium extraction from spodumene for further conversion to $Li_3PO_4$.

In some embodiments, the metal phosphate from the LIB black mass leaching can be dissolved 15 in the LIB black mass recycling process to form solution 15a. In some embodiments, the metal phosphate black mass residue can be further dissolved by sulfuric acid.

In some embodiments, a metal to phosphate ratio and/or an oxidation state of the metal in the dissolved metal phosphate solution 15a can be adjusted 16 to form adjusted solution 16a. In some embodiments, an iron to phosphate ratio, an oxidation state of the iron, a manganese to phosphate ratio, an oxidation state of the manganese, the pH, or a combination thereof of the dissolved metal phosphate solution can be adjusted to form adjusted solution. In some embodiments, adjusting the iron to phosphate ratio and/or the iron oxidation of the dissolved metal phosphate solution can include adding iron and/or $FeSO_4$ to the dissolved metal phosphate solution. In some embodiments, adjusting the manganese to phosphate ratio and/or the manganese oxidation of the dissolved metal phosphate solution can include adding manganese and/or manganese sulfate to the dissolved metal phosphate solution.

In some embodiments, metal phosphate can be precipitated 17 from the dissolved metal phosphate solution and/or the adjusted solution. In some embodiments, the metal phosphate can precipitated can be iron phosphate, ferric phosphate, ferrous phosphate, manganous phosphate, manganese phosphate, manganese iron phosphate, or combinations thereof. In some embodiments, the metal phosphate can be $MnHPO_4$, $MnPO_4$, $FeHPO_4$, $FePO_4$, $(Mn1-xFex)3(PO4)2 \cdot xH2O$, or combinations thereof.

In some embodiments, iron phosphate (e.g., $Fe_3(PO4)_2 \cdot x \cdot H_2O$) can be precipitated by raising the pH to above 6 using basic solutions (e.g., NaOH). The iron phosphate (e.g., $Fe_3(PO4)_2 \cdot x \cdot H_2O$) can be dehydrated to get iron phosphate under reducing conditions such as $H_2$ or by mixing with a polymer and at temperatures greater than 500° C. In some embodiments, iron phosphate (e.g., $FePO_4 \cdot 2H_2O$) can be precipitated from the adjusted solution by adding an oxidizing agent (e.g., $H_2O_3$) and a basic solution (e.g., NaOH) to adjust the pH to 2-4. The $FePO_4 \cdot 2H_2O$ can be dehydrated at about 600° C. to obtain $FePO_4$. In some embodiments, with respect to the Mn, Fe containing solutions, iron manganese phosphate (e.g., $(Mn,Fe)3(PO4)_2 \cdot x \cdot H_2O$) can be precipitated by dehydrating the solution via heating the solutions (up to about 400° C.) under inert or reducing conditions.

In some embodiments, the precipitation reactions can include $3Fe^{2+} + 3SO_4^{2-} + nH^+ + 2PO_4^{3-} + 6Na^+ + nOH^- \rightarrow Fe3(PO4)2 \cdot 8H2O(^-) + 6Na^+ + 3SO_4^{2-} + (n-8)H^+ + (n-8)OH^-$. In some embodiments, the ferrous $Fe^{2+}$ ions can be oxidized to ferric $Fe^{3+}$ ions using hydrogen peroxide: $2Fe^{2+} + H_2O_2 + 2H^+ \rightarrow 2Fe^{3+} + 2H_2O$. The ferric $Fe^{3+}$ ions can react with phosphate ions $PO_4^{3+}$ forming iron phosphate precipitates leaving $Na_2SO_4$ in solution: $Fe^{3+} + SO_4^{2-} + nH^+ + PO_4^{3-} + 2Na^+ + nOH^- \rightarrow FePO4 \cdot 2H2O(^-) + 2Na^+ + SO_4^{2-} + (n-2)H^+ + (n-2)OH^-$.

In some embodiments, precipitating metal phosphate (e.g., iron phosphate, ferric phosphate, ferrous phosphate, manganous phosphate, manganese phosphate, manganese iron phosphate, or combinations thereof) can generate a waste. In some embodiments, the waste can include sodium sulfate ($Na_2SO_4$). As such, this waste can be added to the waste from the lithium extraction process 2. By having the same waste streams, this can reduce cost and increase efficiency of the overall lithium metal phosphate production process. In some embodiments, the sodium sulfate waste can be converted back to sulfuric acid and NaOH using various procedures such as electrodialysis. In some embodiments, the recovered sulfuric acid can then be reused for spodumene leaching, LIB black mass leaching, and/or metal phosphate dissolution. In some embodiments, the recovered NaOH can be used for $Li_3PO_4$ precipitation in the lithium extraction process and/or metal phosphate precipitation in the LIB black mass recycling process. This can significantly reduce waste discharged from the overall lithium metal phosphate production process.

In some embodiments, the precipitated metal phosphate can be washed and/or filtered 18. In some embodiments, the precipitated metal phosphate can be washed water (e.g., DI water) until the conductivity of the washing liquor reaching less than about 500 microsimens. In some embodiments, the washed precipitated metal phosphate can be filtered in a filtered press or centrifuged. In some embodiments, the precipitated metal phosphate can then be dried. In some embodiments, the metal phosphate can then be a raw material feedstock for the lithium metal phosphate synthesis process.

Figure 2:
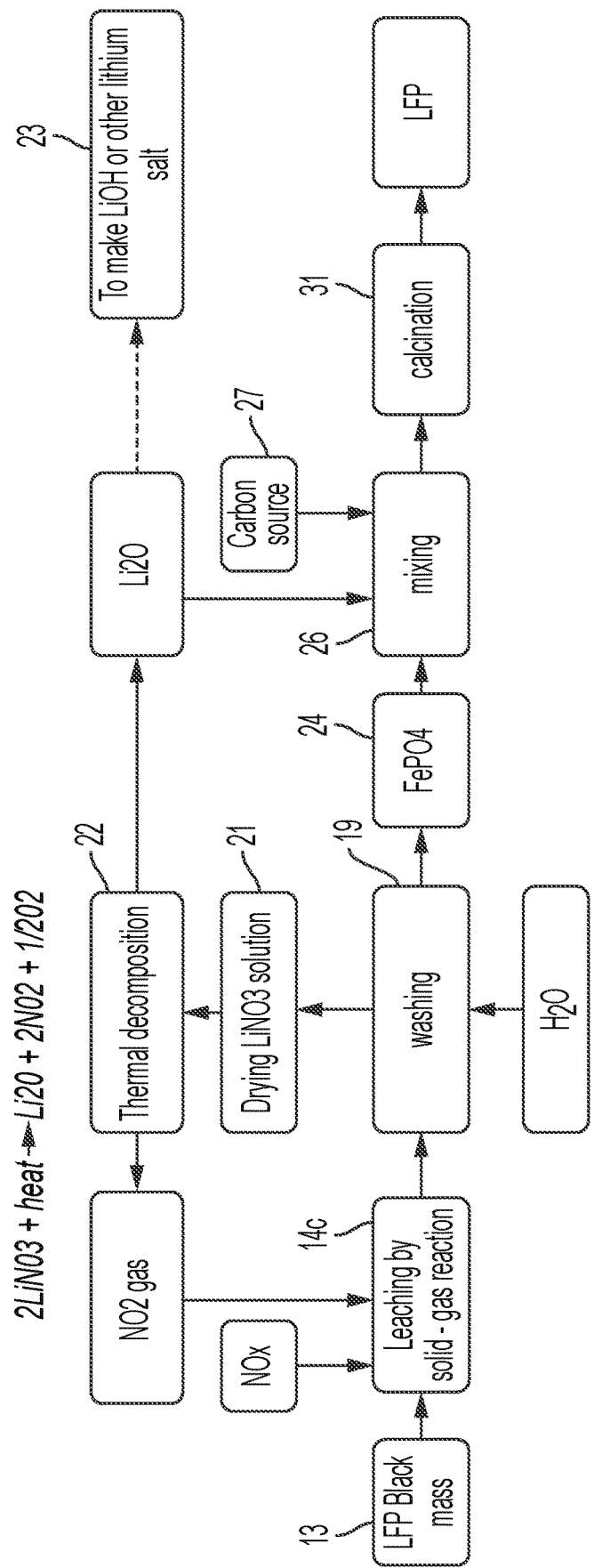
FIG. 2 illustrates a second exemplary flowchart for a lithium metal phosphate production process in accordance with some embodiments disclosed herein.

In some embodiments, extracting lithium from LIB black mass can include reacting LIB black mass with an oxidizing gas as shown in the flowchart of FIG. 2. This can be considered leaching 14c by a solid-gas reaction. In some embodiments, the oxidizing gas comprises NOx (e.g., $NO_2$), $Cl_2$, ozone, and/or $SO_x$ (e.g., $SO_2$, $SO_3$). In some embodiments, reacting LIB black mass with an oxidizing gas can form metal phosphate (e.g., iron phosphate, ferric phosphate, ferrous phosphate, manganous phosphate, manganese phosphate, manganese iron phosphate, or combinations thereof), metal oxides, and/or lithium salts. In some embodiments, the metal phosphate can be $MnHPO_4$, $MnPO_4$, $FeHPO_4$, $FePO_4$, $(Mn1-xFex)3(PO4)2 \cdot xH2O$, or combinations thereof. In some embodiments, the metal phosphate can be $MnPO_4$, $FePO_4$, $(Mn,Fe)PO_4$, or combinations thereof. In some embodiments, the lithium salt can be $LiNO_3$, LiCl, and/or $Li_2SO_4$ depending on the oxidizing gas, among other factors. In some embodiments, the lithium salt can be washed 19 (e.g., by water) and collected for making other lithium materials such as $Li_2O$, LiOH, $Li_2CO_3$, and/or $Li_3PO_4$.

In some embodiments, the reaction of LIB black mass with $SO_x$ forms ferric phosphate, ferrous phosphate, manganous phosphate, manganese phosphate, manganese iron phosphate, or combinations thereof and/or lithium sulfate. In some embodiments, the reaction of LIB black mass with $SO_x$ forms $MnHPO_4$, $MnPO_4$, $FeHPO_4$, $FePO_4$, $(Mn1-xFex)3(PO4)_2 \cdot xH2O$, or combinations thereof and/or lithium sulfate. In some embodiments, the reaction of LIB black mass with $SO_x$ forms $MnPO_4$, $FePO_4$, $(Mn,Fe)PO_4$, or combinations thereof and/or lithium sulfate. In some embodiments, the lithium sulfate and metal phosphate can be separated from one another. In some embodiments, the lithium sulfate can be mixed with a solvent to form a lithium sulfate solution that can be combined with the lithium salt solution 8 of the lithium extraction process.

In some embodiments, the reaction of LIB black mass with NOx can form $FePO_4$ and $LiNO_3$. The $LiNO_3$ can be washed 19 out with water, followed by drying 21, and thermal decomposition 22 to $Li_2O$ and $NO_2$. $LiNO_3$ can be thermally decomposed at temperatures about 600° C. to form lithium oxide, $NO_2$, $O_2$, or combinations thereof. In some embodiments, $NO_2$ can be fed back for use in leaching by the solid-gas reaction with LIB black mass. In some embodiments, the $Li_2O$ can be utilized as a raw material feedstock for the lithium metal phosphate synthesis process in combination with a metal phosphate. In some embodiments, Li2O can reacts with $FePO_4$ under reducing conditions or with $Fe_2P_2O_7$ under inert conditions forming $LiFePO_4$: Li2O+2FePO4+CO=→2LiFePO4+CO2 and Li2O+Fe2P2O7→2LiFePO4.

In some embodiments, the $Li_2O$ can be used to make other lithium salts 23 (e.g., LiOH, lithium sulfate, etc.). These other salts can be used in any other step of the methods disclosed herein.

In some embodiments, the reaction of LIB black mass with $Cl_2$ can form LiCl and a metal phosphate. In some embodiments, the LiCl can be washed and used to make other lithium salts (e.g., LiOH, lithium sulfate, etc.). These other salts can be used in any other step of the methods disclosed herein.

The gas-solid reaction can be fast and can allow a continuous process for lithium leaching and washing, which can lead to less waste and reduce or remove dissolution of metals such as iron, copper, and aluminum, thereby avoiding costs of further purification steps.

In some embodiments, a lithium metal phosphate production process can include providing and/or obtaining 24 metal phosphate (e.g., ferric phosphate, ferrous phosphate, manganous phosphate, manganese phosphate, manganese iron phosphate, or combinations thereof) and lithium phosphate 25. In some embodiments, the metal phosphate can be $MnHPO_4$, $MnPO_4$, $FeHPO_4$, $FePO_4$, $(Mn_{1-x}Fe_x)_3(PO_4)_2 \cdot xH_2O$, or combinations thereof. In some embodiments, the metal phosphate can be metal phosphate obtained from the LIB black mass recycling process described herein. In some embodiments, the lithium phosphate can be lithium phosphate obtained from the lithium extraction process described herein. In some embodiments, the metal phosphate and the lithium phosphate can be mixed 26 to form a lithium metal phosphate precursor mixture. In some embodiments, the metal phosphate and lithium phosphate can also be mixed with a carbon source, manganese source, and/or iron source 27 to form the lithium metal phosphate precursor mixture. In some embodiments, the iron source can be iron oxalate, iron citrate, iron oxide, or a combination thereof. In some embodiments, the carbon source can be organic or polymeric materials such as polystyrene, polyethylene, polypropylene and/or the like, sucrose, lactose, PVA, PVB, carbon nanotubes, carbon fiber, graphene, or a combination thereof.

In some embodiments, the lithium phosphate and the metal phosphate (and carbon and/or iron source) can be mixed at a stoichiometric ratio. In some embodiments, iron oxalate is added to the metal phosphate and lithium phosphate to adjust the lithium, iron, and phosphate ratio to a stoichiometric amount.

After mixing the metal phosphate with the lithium phosphate to form the lithium metal phosphate precursor, the lithium metal phosphate precursor can be processed to form lithium metal phosphate. In some embodiments, processing the lithium metal phosphate precursor to form the lithium metal phosphate can include milling the lithium metal phosphate precursor and/or calcining the lithium metal phosphate precursor. In some embodiments, the lithium metal phosphate precursor mixture can be milled 28. In some embodiments, the milling can be wet milling, bead milling, or combinations thereof. In some embodiments, the milled lithium metal phosphate precursor mixture can have a particle size distribution D50 of less than about 1 micron, less than about 0.75 microns, less than about 0.5 microns, less than 0.25 microns, or less than about 0.2 microns. In some embodiments, the particle size distribution D50 of the milled lithium metal phosphate precursor mixture can be about 0.001-1 microns, about 0.01-1 microns, about 0.01-0.75 microns, about 0.01-0.5 microns, or about 0.01-0.2 microns.

In some embodiments, the milled lithium metal phosphate precursor material can be dried 29. In some embodiments, the drying can be accomplished by spray drying and/or flash drying. In some embodiments, the (milled and/or dried) lithium metal phosphate precursor can be calcined to form a lithium metal phosphate material. In some embodiments, the lithium metal phosphate material includes lithium iron phosphate, lithium iron manganese phosphate, or combinations thereof. In some embodiments, the calcination can be at a temperature of at least about 400° C., at least about 450° C., at least about 500° C., at least about 550° C., at least about 600° C., at least about 650° C., or at least about 700° C. In some embodiments, the calcination can be at a temperature of at most about 900° C., at most about 850° C., at most about 800° C., at most about 750° C., at most about 700° C., at most about 650° C., or at most about 600° C. In some embodiments, the lithium metal phosphate precursor can be calcined for about 2-12 hours. In some embodiments, the calcined lithium metal phosphate material can be milled and/or sieved 32 prior to packaging 33.

In some embodiments, the lithium metal phosphate material can have a particle size distribution D50 of about 0.1-5 microns, about 0.1-3 microns, about 0.1-2 microns, or about 0.5-1.5 microns. In some embodiments, the lithium metal phosphate material can have a particle size distribution D10 of at least about 0.01 microns, at least about 0.05 microns, at least about 0.1 microns, or at least about 0.2 microns. In some embodiments, the lithium metal phosphate material can have a particle size distribution D90 of at most about 20 microns, at most about 15 microns, at most about 12 microns, or at most about 10 microns. As used herein, "D50" refers to the median particle size measured from the particle size analyzer (PSA), or the particle size (diameter) at 50% in a cumulative distribution. Since primary particle tends to aggregate to each other, especially in nanosized powders, the PSA measurement value (e.g., D10, D50, D90, D100) does not always represent the size of single-crystal particle. Further, as used here, "D10" refers to the particle size (diameter) at 10% in a cumulative distribution, and "D90" refers to the particle size (diameter) at 90% in a cumulative distribution.

In some embodiments, lithium metal phosphate material has a powder resistance of at most about 150 Ω·cm, at most about 125 Ω·cm, at most about 100 Ω·cm, at most about 75 Ω·cm, or at most about 50 Ω·cm. In some embodiments, the powder resistance can be measured with Mitsubishi MCP-PD51 powder press density and resistivity tester. In some embodiments, the powder resistance can be measured via insulated measuring cell with two electrodes. DC voltage can be applied to the electrodes and ammeter can measure current flow. The powder volume resistivity is derived from the average calculated resistance, height and length of the electrodes and space in between.

In some embodiments, the lithium metal phosphate material has a carbon content of less than about 5 wt. %, less than about 2.5 wt. %, less than about 2 wt. %, or less than about 1.5 wt. %. In some embodiments, the lithium metal phosphate material has a carbon content of at most about 0.5 wt. %, at most about 1 wt. %, or at most about 1.5 wt. %. In some embodiments, the lithium metal phosphate material has a carbon content of about 0.1-5 wt. %, about 0.5-3 wt. %, or about 1-1.5 wt. %. In some embodiments, carbon content can be measured by an elemental analyzer via oxidation of the sample. In some embodiments, the carbon content can be measured by using Eltra C/S analyzer.

In some embodiments, the lithium metal phosphate material has a specific surface area of at least about 5 $m^2/g$, at least about 8 m²/g, at least about 9 m²/g, at least about 10 m²/g, or at least about 11 m²/g. In some embodiments, the lithium metal phosphate material has a specific surface area of at most about 15 m²/g, at most about 12 m²/g, at most about 11 m²/g, at most about 10 m²/g, or at most about 9 m²/g. In some embodiments, the lithium metal phosphate material has a specific surface area of about 1-20 m²/g, about 5-15 m²/g, or about 8-12 m²/g. In some embodiments, specific surface area can be measured via adsorption analysis (e.g., BET isotherms).

In some embodiments, the lithium metal phosphate material has a tap density of at least about 0.1 g/cm³, at least about 0.5 g/cm³, at least about 0.7 g/cm³, at least about 0.8 g/cm³, or at least about 0.9 g/cm³. In some embodiments, the lithium metal phosphate material has a tap density of at most about 2 g/cm³, at most about 1.5 g/cm³, at most about 1 g/cm³, at most about 0.9 g/cm³, or at most about g/cm³. In some embodiments, the lithium metal phosphate material has a tap density of about 0.5-1.5 g/cm³, about 0.7-1.2 g/cm³, or about 0.8-1 m²/g. In some embodiments, tap density can be measured with a powder tap density meter, tapping 3000 times.

In some embodiments, the lithium metal phosphate material has a moisture content of less than about 2000 ppm, less than about 1500 ppm, less than about 1000 ppm, less than about 750 ppm, or less than about 500 ppm. In some embodiments, moisture content can be measured by using a Karl Fisher instrument at 200° C. In some embodiments, moisture content can be measured by coulometric titration.

In some embodiments, the lithium metal phosphate material has a pH of about 8.5-9.5 or about 9. In some embodiments, pH can be measured by putting 5 g powder in 100 mL of DI water, stirring for 5 minutes, and then filtering to separate the supernatant with solid. The pH is then measured of the supernatant with a pH meter.

In some embodiments, the LFP material has an initial coulombic efficiency (ICE) (at 0.1 C rate) of about 90-100%, about 92-98%, about 94-98%, about 95-97%, greater than 95%, or about 96%. In some embodiments, the lithium metal phosphate material has a specific capacity (0.1 C) half cell 2.5-3.7V of about 100-300 mAh/g, about 120-250 mAh/g, about 150-200 mAh/g, about 150-170 mAh/g, or about 160 mAh/g. ICE and specific capacity can be measured via half-cell cycling with increasing C-rate (e.g., 0.5-1 C between 2-3.7V).

In some embodiments, the lithium metal phosphate material disclosed herein can be used as an electrode material. In some embodiments, the lithium metal phosphate disclosed herein can be used as a cathode and/or anode material. In some embodiments, the properties of the lithium metal phosphate material described above are also the properties of the electrode material.

Battery Cells, Battery Modules, Battery Packs, and Electric Vehicle Systems

As stated above, the lithium metal phosphate material can be utilized as an electrode material. For example, the lithium metal phosphate material disclosed herein can be used in an electrode layer (e.g., cathode or anode layer) of a battery cell disclosed herein.

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the lithium metal phosphate materials, electrodes, components, systems, methods, apparatuses, devices, compositions, etc. described herein can be implemented into the battery cells, battery modules, battery packs, and methods of making these battery cells, battery modules, and battery packs.

Figure 3:
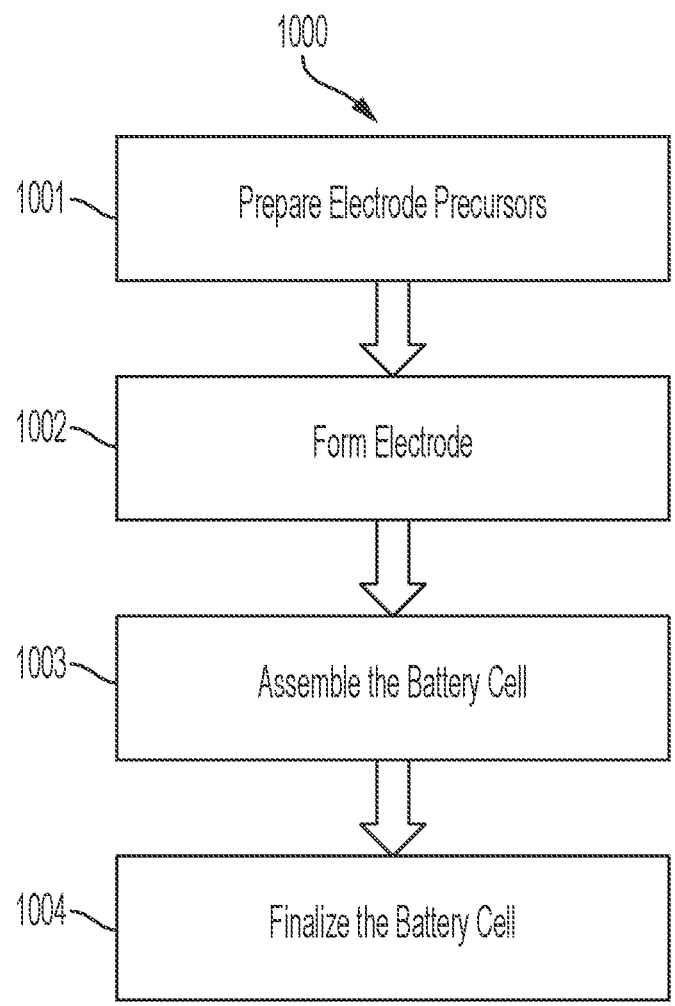
FIG. 3 illustrates a flowchart for a typical battery cell manufacturing process in accordance with some embodiments disclosed herein.

FIG. 3 illustrates a flow chart for a typical battery cell manufacturing process 1000. These steps are not exhaustive and other battery cell manufacturing processes can include additional steps or only a subset of these steps. At step 1001, the electrode precursors (e.g., binder, active material, conductive carbon additive) can be prepared. In some embodiments, this step can include mixing electrode materials (e.g., active materials) with additional components (e.g., binders, solvents, conductive additives, etc.) to form an electrode slurry. In some embodiment, this step can include synthesizing the electrode materials themselves.

At step 1002, the electrode can be formed. In some embodiments, this step can include coating an electrode slurry on a current collector. In some embodiments, the electrode or electrode layer can include electrode active materials, conductive carbon material, binders, and/or other additives. In some embodiments, the electrode active materials can include cathode active materials. In some embodiments, the electrode active materials can include the lithium metal phosphate materials (e.g., LFP, LMFP) disclosed herein. In some embodiments, the cathode active materials can include (e.g., as mixtures of) high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium cobalt oxide (LCO), lithium manganese oxide (LMO), lithium metal phosphates disclosed herein like lithium iron phosphate ("LFP"), lithium iron manganese phosphate ("LMFP"), sulfur containing cathode materials, lithium sulfide ($Li_2S$), lithium polysulfides, titanium disulfide ($TiS_2$), and combinations thereof.

In some embodiments, the electrode active materials can include anode active materials assembled into a cell including cathode active materials. In some embodiments, the anode active materials can include graphitic carbon (e.g., ordered or disordered carbon with sp2 hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—Al, Li—Ag alloy), lithium titanate, or combinations thereof. In some embodiments, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell may not comprise an anode active material in an uncharged state.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof. In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3, 4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

After coating, the coated current collector can be dried to evaporate any solvent. In some embodiments, this step can include calendaring the coated current collectors. Calendaring can adjust the physical properties (e.g., bonding, conductivity, density, porosity, etc.) of the electrodes. In some embodiments, the electrode can then be sized via a slitting and/or notching machine to cut the electrode into the proper size and/or shape.

In some embodiments, solid electrolyte materials of the solid electrolyte layer can include inorganic solid electrolyte materials such as oxides, sulfides, phosphides, halides, ceramics, solid polymer electrolyte materials, hybrid solid state electrolytes, or glassy electrolyte materials, among others, or in any combinations thereof. In some embodiments, the solid electrolyte layer can include a polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$), among others, or in any combinations thereof. In some embodiments, the solid electrolyte layer can include a glassy, ceramic and/or crystalline electrolyte material such as $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, lithium phosphorous oxy-nitride ($Li_xPO_yN_z$), lithium germanium phosphate sulfur ($Li_{10}GeP_2Si_2$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), Lithium lanthanum zirconium oxide ($La_3Li_7O_{12}Zr_2$), LiSiCON (Li2+2xZn1-xGeO4), lithium lanthanum titanate (Li3xLa2/3-xTiO3) and/or sulfide-based lithium argyrodites with formula $Li_6PS_5X$ (X=Cl, Br) like $Li_6PS_5Cl$, among others, or in any combinations thereof. Furthermore, solid state polymer electrolyte materials can include a polymer electrolyte material (e.g., a hybrid or pseudo-solid state electrolyte), for example, polyacrylonitrile (PAN), polyethylene oxide (PEO), polymethylmethacrylate (PMMA), and polyvinylidene fluoride (PVDF), and PEG, among others, or in any combinations thereof.

At step 1003, the battery cell can be assembled. After the electrodes, separators, and/or electrolytes have been prepared, a battery cell can be assembled/prepared. In this step, the separator and/or an electrolyte layer can be assembled between the anode and cathode layers to form the internal structure of a battery cell. These layers can be assembled by a winding method such as a round winding or prismatic/flat winding, a stacking method, or a z-folding method.

The assembled cell structure can then be inserted into a cell housing which is then partially or completed sealed. In addition, the assembled structure can be connected to terminals and/or cell tabs (via a welding process). For battery cells utilizing a liquid electrolyte, the housed cell with the electrode structure inside it can also be filled with electrolyte and subsequently sealed.

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll. In some embodiments, the electrolyte material includes, but is not limited to, an ionically conductive fluid or other material (e.g., a layer) that can allow the flow of electrical charge (i.e., ion transportation) between the cathode and anode. In some embodiments, the electrolyte material can include a non-aqueous polar solvent (e.g., a carbonate such as ethylene carbonate, propylene carbonate, diethyl carbonate, ethyl methyl carbonate, dimethyl carbonate, or a mixture of any two or more thereof). The electrolytes may also include other additives such as, but not limited to, vinylidene carbonate, fluoroethylene carbonate, ethyl propionate, methyl propionate, methyl acetate, ethyl acetate, or a mixture of any two or more thereof. The lithium salt of the electrolyte may be any of those used in lithium battery construction including, but not limited to, lithium perchlorate, lithium hexafluorophosphate, lithium bis(fluorosulfonyl)imide, lithium bis(trifluorosulfonyl)imide, or a mixture of any two or more thereof. In addition, the salt may be present in the electrolyte from greater than 0 M to about 5 M, or for example salt may be present between about 0.05 to 2 M or about 0.1 to 2 M.

Figure 4:
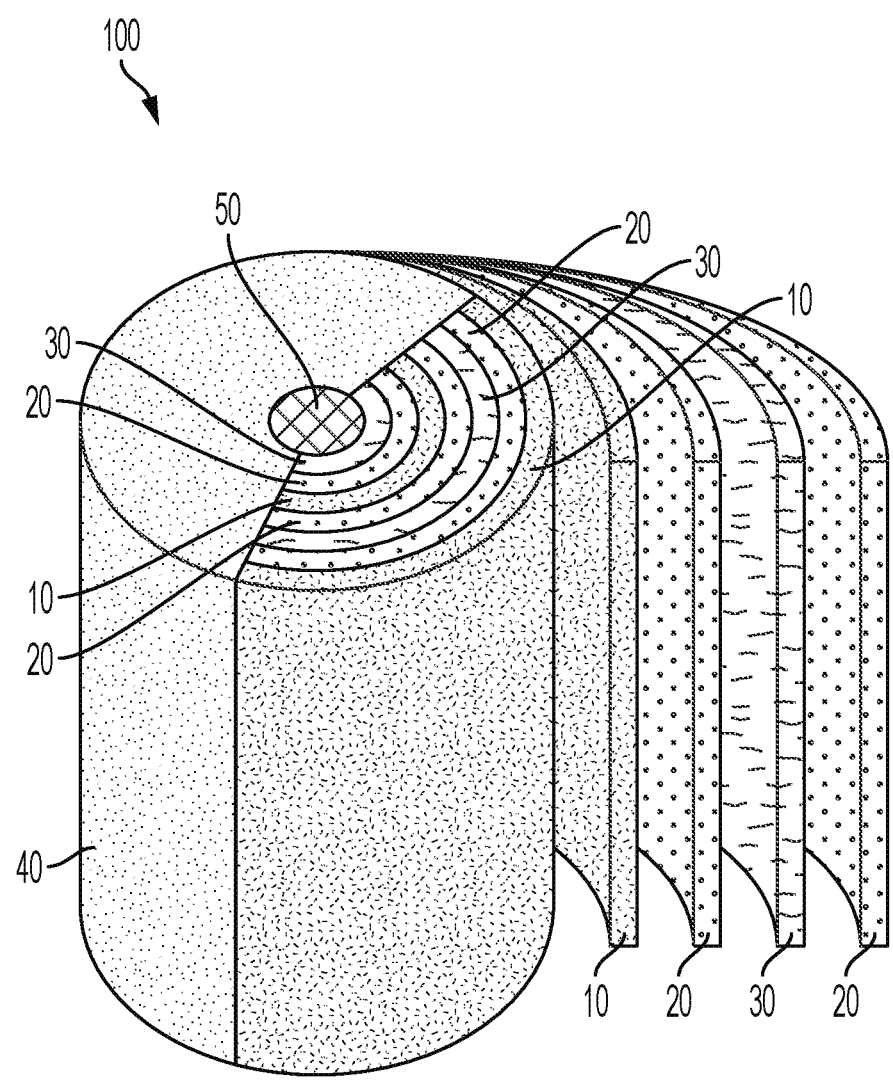
FIG. 4 depicts an illustrative example of a cross sectional view of a cylindrical battery cell in accordance with some embodiments disclosed herein.

FIG. 4 depicts an illustrative example of a cross sectional view of a cylindrical battery cell 100. The cylindrical battery cell can include layers (e.g., sheet-like layers) of anode layers 10, separator and/or electrolyte layers 20, and cathode layers 30.

A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions.

These layers (cathode, anode, separator/electrolyte layers) can be sandwiched, rolled up, and/or packed into a cavity of a cylinder-shaped casing 40 (e.g., a metal can). The casings/housings can be rigid such as those made from metallic or hard-plastic, for example. In some embodiments, a separator layer (and/or electrolyte layer) 20 can be arranged between an anode layer 10 and a cathode layer 30 to separate the anode layer 20 and the cathode layer 30. In some embodiments, the layers in the battery cell can alternate such that a separator layer (and/or electrolyte layer) separates an anode layer from a cathode layer. In other words, the layers of the battery electrode can be (in order) separator layer, anode/cathode layer, separator layer, opposite of other anode/cathode layer and so on. The separator layer (and/or electrolyte layer) 20 can prevent contact between the anode and cathode layers while facilitating ion (e.g., lithium ions) transport in the cell. The battery cell can also include at least one terminal 50. The at least one terminal can be electrical contacts used to connect a load or charger to a battery cell. For example, the terminal can be made of an electrically conductive material to carry electrical current from the battery cell to an electrical load, such as a component or system of an electric vehicle as discussed further herein.

Figure 5:
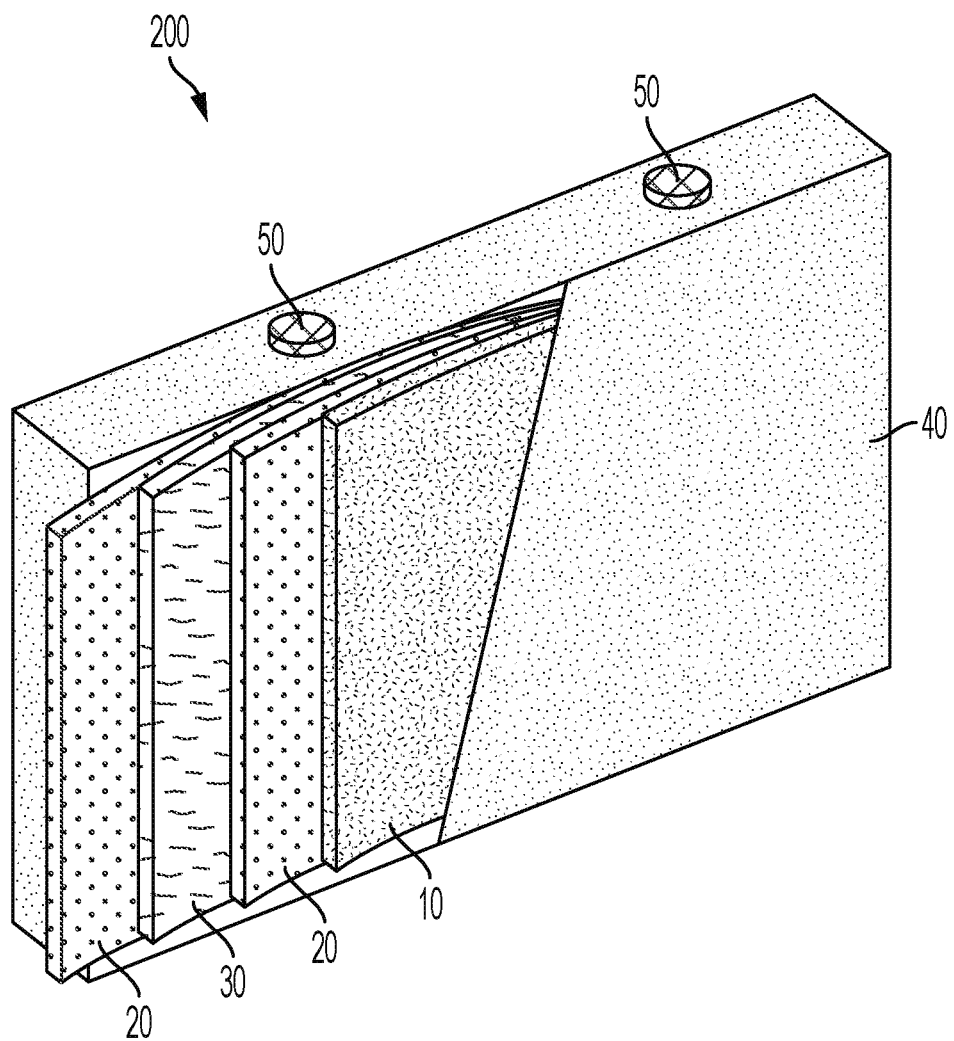
FIG. 5 depicts an illustrative example of a cross sectional view of a prismatic battery cell in accordance with some embodiments disclosed herein.

FIG. 5 depicts an illustrative example of a cross sectional view of a prismatic battery cell 200. The prismatic battery cell can include layers (e.g., sheet-like layers) of anode layers 10, separator and/or electrolyte layers 20, and cathode layers 30. Similar to the cylindrical battery cell, the layers of a prismatic battery cell can be sandwiched, rolled, and/or pressed to fit into cubic or rectangular cuboid (e.g., hyper-rectangle) shaped casing/housing 40. In some embodiments, the layers can be assembled by layer stacking rather than jelly rolling. In some embodiments, the casing or housing can be rigid such as those made from a metal and/or hard-plastic. In some embodiments, the prismatic battery cell 200 can include more than one terminal 50. In some embodiments, one of these terminals can be the positive terminal and the other a negative terminal. These terminals can be used to connect a load or charger to the battery cell.

Figure 6:
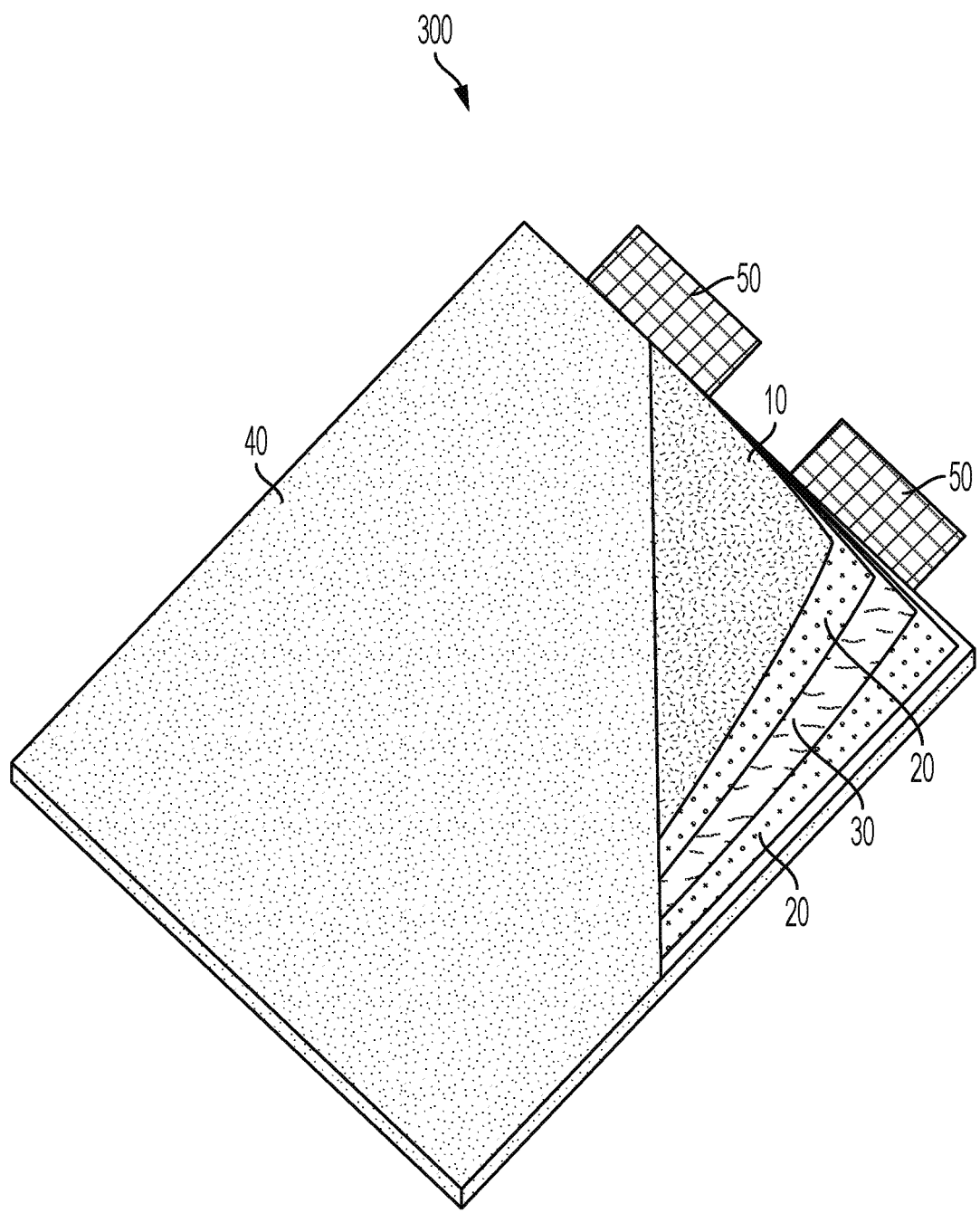
FIG. 6 depicts an illustrative example of a cross section view of a pouch battery cell in accordance with some embodiments disclosed herein.

FIG. 6 depicts an illustrative example of a cross section view of a pouch battery cell 300. The pouch battery cells do not have a rigid enclosure and instead use a flexible material for the casing/housing 40. This flexible material can be, for example, a sealed flexible foil. The pouch battery cell can include layers (e.g., sheet-like layers) of anode layers 10, separator and/or electrolyte layers 20, and cathode layers 30. In some embodiments, these layers are stacked in the casing/housing. In some embodiments, the pouch battery cell 200 can include more than one terminal 50. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others) and/or a thermoplastic material (e.g., polyethylene, polypropylene, polystyrene, polyvinyl chloride, or nylon), among others.

At step 1004, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 7:
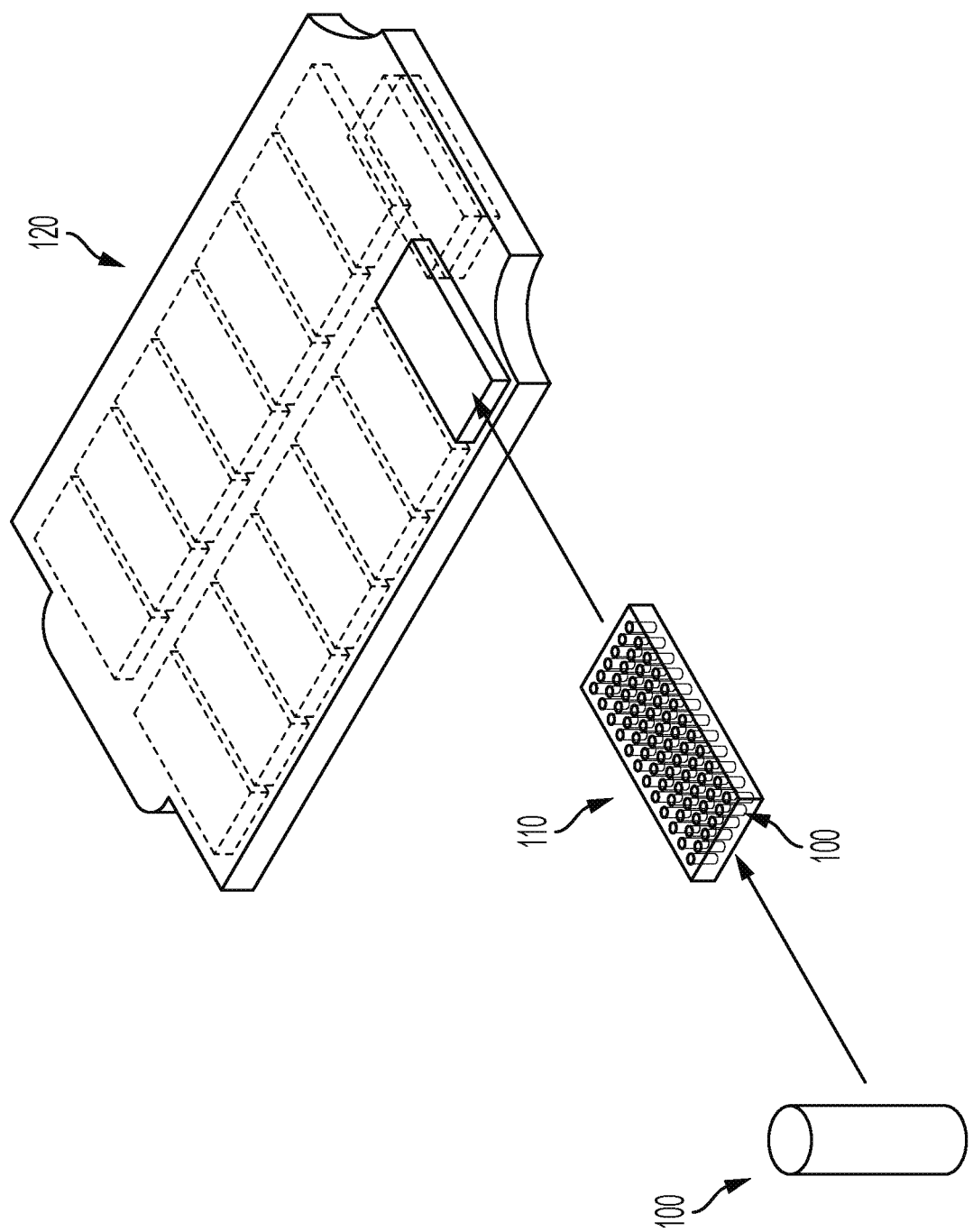
FIG. 7 illustrates cylindrical battery cells being inserted into a frame to form a battery module and pack in accordance with some embodiments disclosed herein.
Figure 8:
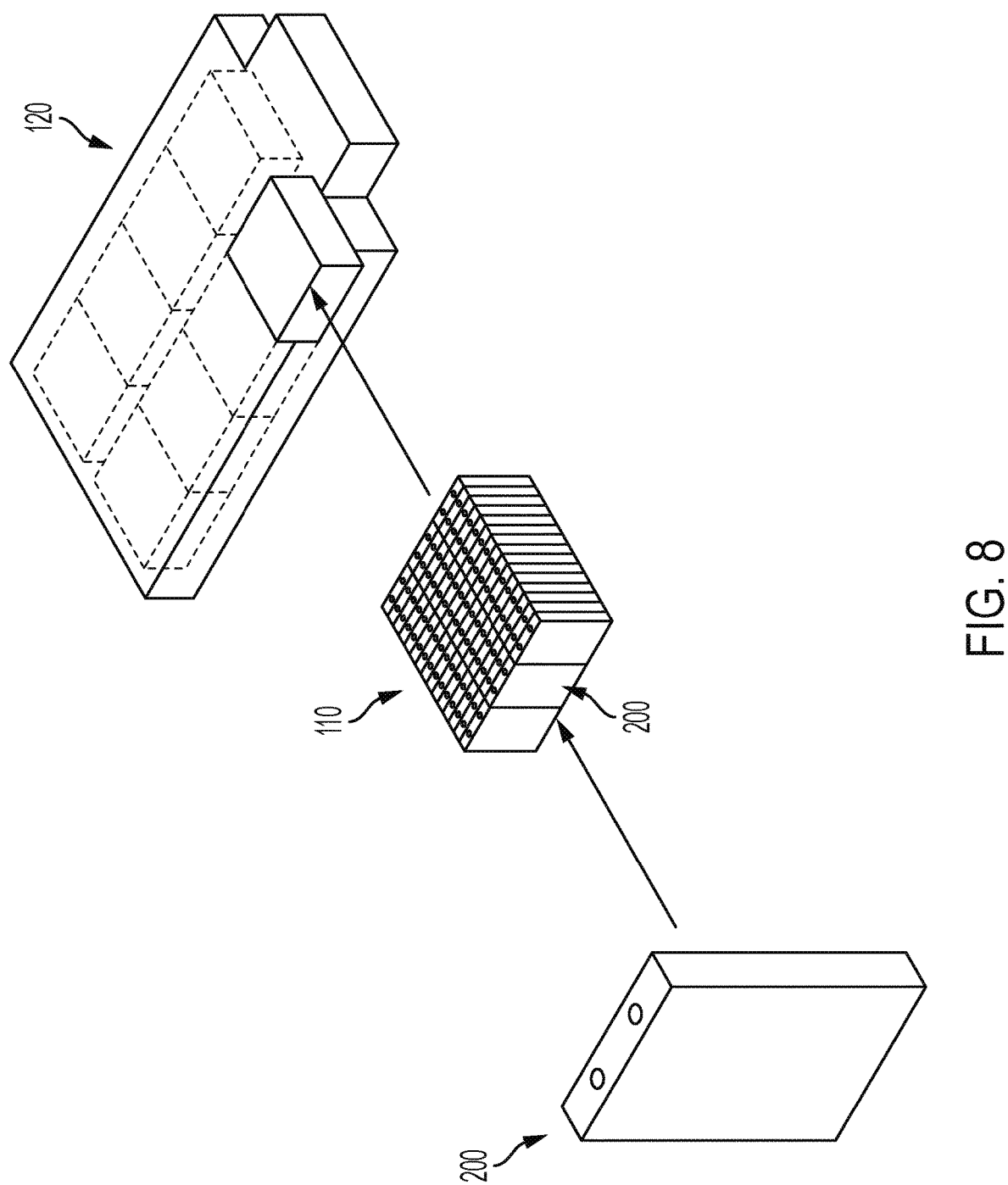
FIG. 8 illustrates prismatic battery cells being inserted into a frame to form a battery module and pack in accordance with some embodiments disclosed herein.
Figure 9:
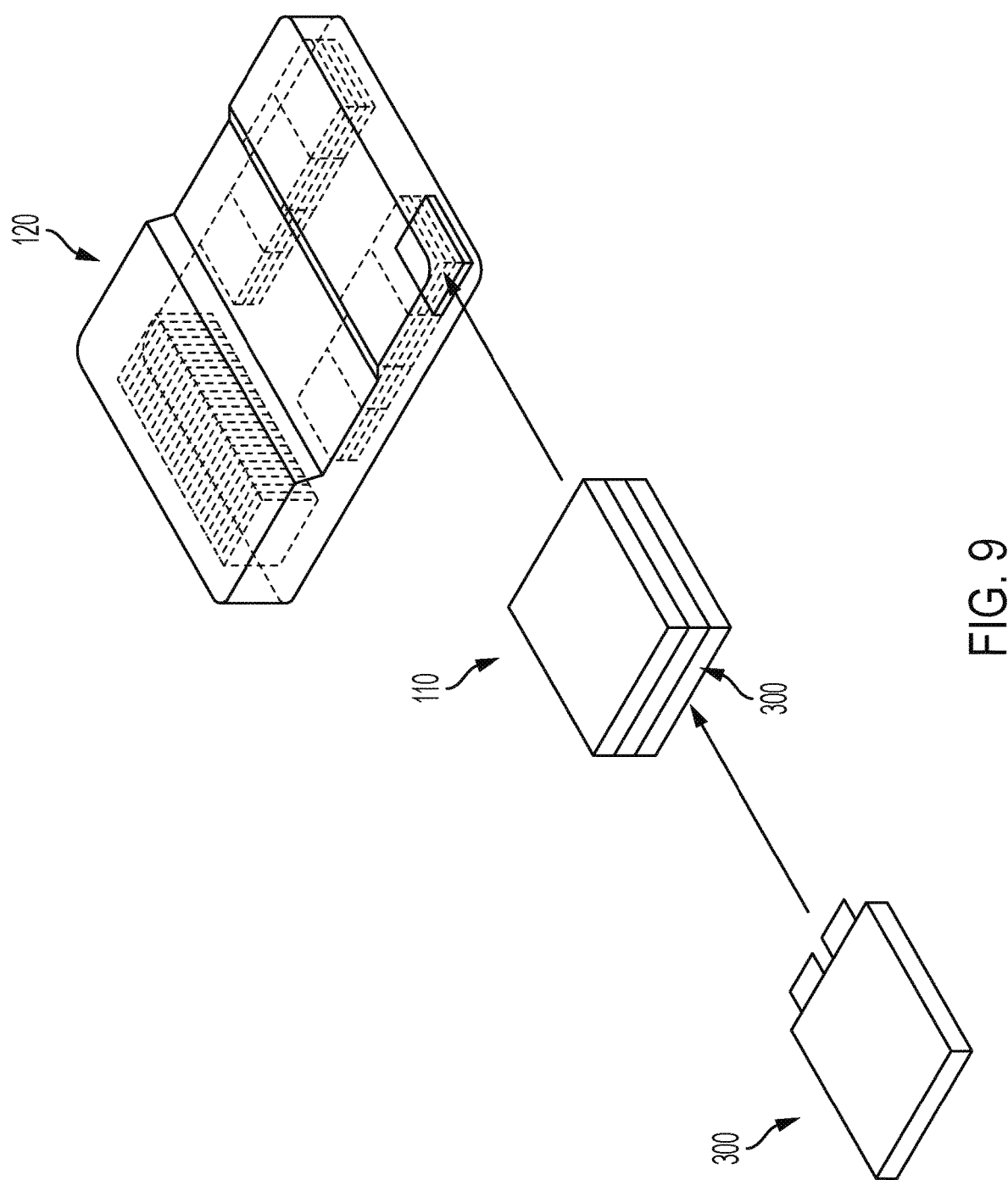
FIG. 9 illustrates pouch battery cells being inserted into a frame to form a battery module and pack in accordance with some embodiments disclosed herein.

A plurality of battery cells (100, 200, and/or 300) can be assembled or packaged together in the same housing, frame, or casing to form a battery module and/or battery pack. The battery cells of a battery module can be electrically connected to generate an amount of electrical energy. These multiple battery cells can be linked to the outside of the housing, frame, or casing, through a uniform boundary. The battery cells of the battery module can be in parallel, in series, or in a series-parallel combination of battery cells. The housing, frame, or casing can protect the battery cells from a variety of dangers (e.g., external elements, heat, vibration, etc.). FIG. 7 illustrates cylindrical battery cells 100 being inserted into a frame to form battery module 112. FIG. 8 illustrates prismatic battery cells 200 being inserted into a frame to form battery module 112. FIG. 9 illustrates pouch battery cells 300 being inserted into a frame to form battery module 112. In some embodiments, the battery pack may not include modules. For example, the battery pack can have a "module-free" or cell-to-pack configuration wherein battery cells are arranged directly into a battery pack without assembly into a module.

A plurality of the battery modules 112 can be disposed within another housing, frame, or casing to form a battery pack 120 as shown in FIGS. 7-9. In some embodiments, a plurality of battery cells can be assembled, packed, or disposed within a housing, frame, or casing to form a battery pack (not shown). In such embodiments, the battery pack may not include a battery module (e.g., module-free). For example, the battery pack can have a module-free or cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 7-9 illustrates three differently shaped battery packs 120. As shown in FIGS. 7-9, the battery packs 120 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 10:
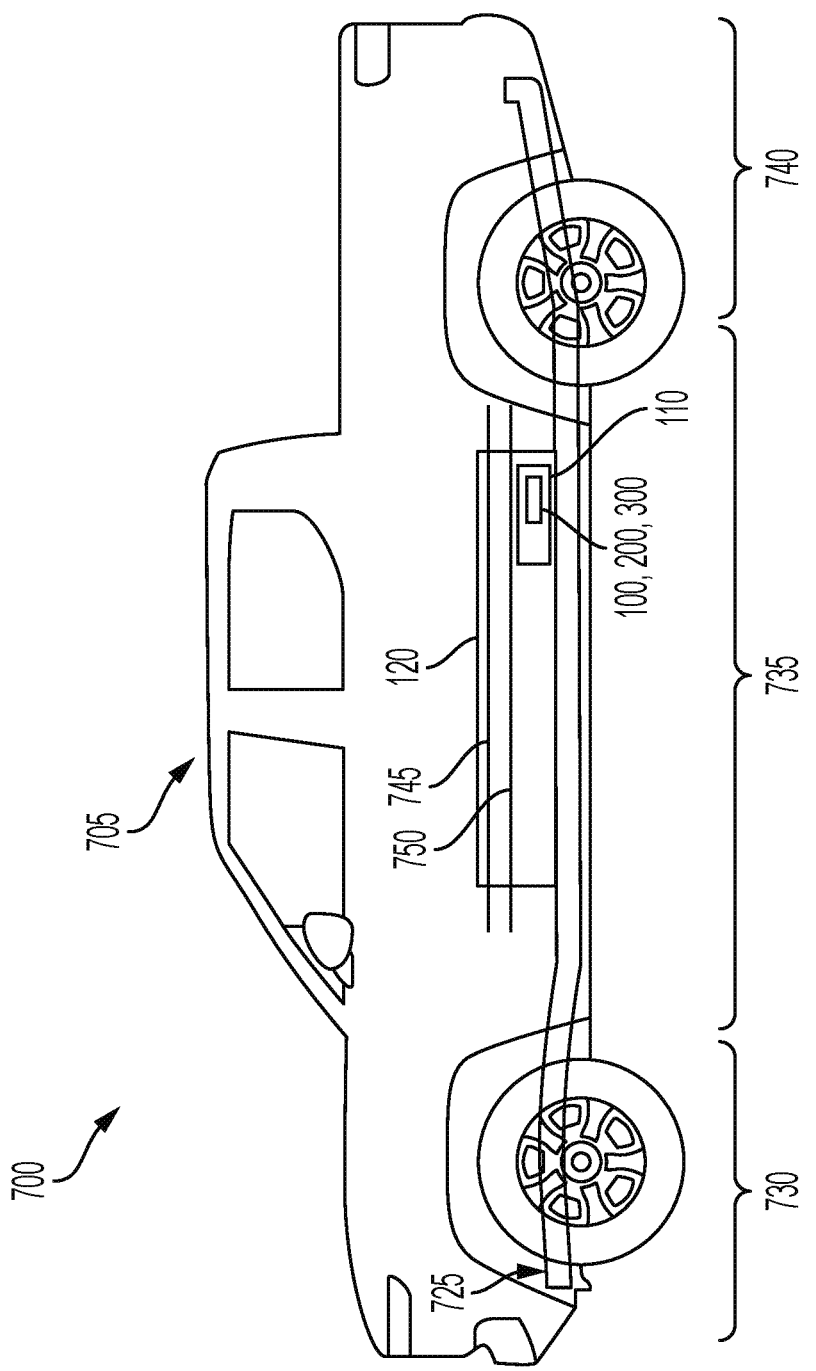
FIG. 10 illustrates an example of a cross sectional view of an electric vehicle that includes at least one battery pack in accordance with some embodiments disclosed herein.

FIG. 10 illustrates an example of a cross sectional view 700 of an electric vehicle 705 that includes at least one battery pack 120. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 705 can be installed with a battery pack 120 that includes battery modules 112 with battery cells (100, 200, and/or 300) to power the electric vehicles. The electric vehicle 705 can include a chassis 725 (e.g., a frame, internal frame, or support structure). The chassis 725 can support various components of the electric vehicle 705. In some embodiments, the chassis 725 can span a front portion 730 (e.g., a hood or bonnet portion), a body portion 735, and a rear portion 740 (e.g., a trunk, payload, or boot portion) of the electric vehicle 705. The battery pack 120 can be installed or placed within the electric vehicle 705. For example, the battery pack 120 can be installed on the chassis 725 of the electric vehicle 705 within one or more of the front portion 730, the body portion 735, or the rear portion 740. In some embodiments, the battery pack 120 can include or connect with at least one busbar, e.g., a current collector element. For example, the first busbar 745 and the second busbar 750 can include electrically conductive material to connect or otherwise electrically couple the battery pack 120 (and/or battery modules 112 or the battery cells 100, 200, and/or 300) with other electrical components of the electric vehicle 705 to provide electrical power to various systems or components of the electric vehicle 705. In some embodiments, battery pack 120 can also be used as an energy storage system to power a building, such as a residential home or commercial building instead of or in addition to an electric vehicle.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method comprising:
   recycling lithium ion battery black mass to form a metal phosphate and a solution comprising lithium sulfate, wherein forming the metal phosphate generates a first waste;
   precipitating lithium phosphate from the solution using a phosphate-containing material, wherein precipitating lithium phosphate from the solution using the phosphate-containing material generates a second waste;
   combining the first waste and the second waste for further processing;

mixing the metal phosphate with the lithium phosphate to form a lithium metal phosphate precursor; and processing the lithium metal phosphate precursor to form lithium metal phosphate.

2. The method of claim 1, wherein processing the lithium metal phosphate precursor comprising: milling the lithium metal phosphate precursor, calcining the lithium metal phosphate precursor, or combinations thereof.

3. The method of claim 1, wherein the lithium metal phosphate comprises lithium iron phosphate (LFP), lithium iron manganese phosphate (LMFP), or combinations thereof.

4. The method of claim 1, wherein the metal phosphate comprises ferric phosphate, ferrous phosphate, manganous phosphate, manganese phosphate, manganese iron phosphate, or combinations thereof.

5. The method of claim 1, further comprising mixing the metal phosphate with an iron source.

6. The method of claim 5, wherein the iron source comprises iron oxalate, iron citrate, iron oxide, or a combination thereof.

7. The method of claim 1, wherein the lithium metal phosphate precursor is calcined between 550-750° C. for 2-12 hours.

8. The method of claim 1, wherein the phosphate-containing material comprises sodium phosphate, phosphoric acid, or a combination thereof.

9. The method of claim 1, further comprising roasting spodumene, leaching the roasted spodumene with sulfuric acid to obtain a second solution comprising lithium sulfate, and combining the first solution and the second solution comprising lithium sulfate prior to precipitating lithium phosphate using the phosphate-containing material.

10. The method of claim 1, wherein forming the metal phosphate and the solution comprising lithium sulfate comprises extracting lithium from lithium ion battery black mass, wherein extracting lithium from lithium ion battery black mass comprises reacting lithium ion battery black mass with an oxidizing gas in a solid-gas reaction.

11. The method of claim 10, wherein the oxidizing gas comprises NOx, $Cl_2$, or $SO_x$.

12. The method of claim 11, wherein the reaction of lithium ion battery black mass comprising lithium metal phosphate with $SO_x$ forms ferric phosphate, lithium sulfate, or combinations thereof.

13. The method of claim 1, wherein forming the metal phosphate and the solution comprising lithium sulfate comprises extracting lithium from lithium ion battery black mass, wherein extracting lithium from lithium ion battery black mass comprises leaching the lithium ion battery black mass with sulfuric acid and hydrogen peroxide or oxygen gas to form at least the metal phosphate.

14. The method of claim 13, further comprising: dissolving the metal phosphate with sulfuric acid, and adjusting a ratio of iron to phosphate, a ratio of manganese to phosphate, an oxidation state of iron, an oxidation state of manganese, or a combination thereof in the dissolved metal phosphate solution.

15. The method of claim 14, wherein the ratio of iron to phosphate, the ratio of manganese to phosphate, the oxidation state of iron, the oxidation state of manganese, or a combination thereof is adjusted using iron, manganese, manganese sulfate, iron sulfate, or combinations thereof.

16. The method of claim 15, further comprising precipitating ferric phosphate, ferrous phosphate, manganous phosphate, manganese phosphate, manganese iron phosphate, or combinations thereof from the dissolved metal phosphate.

17. The method of claim 1, further comprising spray drying the milled mixture.

18. A method comprising:
recycling lithium ion battery black mass to form ferric phosphate, ferrous phosphate, manganous phosphate, manganese phosphate, manganese iron phosphate, or combinations thereof and a first solution comprising lithium sulfate, wherein forming ferric phosphate, ferrous phosphate, manganous phosphate, manganese phosphate, manganese iron phosphate, or combinations thereof generates a first waste;

precipitating lithium phosphate from the first solution comprising lithium sulfate using a phosphate-containing material, wherein precipitating lithium phosphate from the solution using the phosphate-containing material generates a second waste;

combining the first waste and the second waste for further processing;

mixing the ferric phosphate, ferrous phosphate, manganous phosphate, manganese phosphate, manganese iron phosphate, or combinations thereof with the lithium phosphate to form a lithium metal phosphate precursor;

milling the lithium metal phosphate precursor; and calcining the lithium metal phosphate precursor to form lithium iron phosphate (LFP), lithium iron manganese phosphate (LMFP), or a combination thereof.

19. The method of claim 18, further comprising:
recycling lithium ion battery black mass by reacting lithium ion battery black mass with an oxidizing gas comprising NOx, $Cl_2$, or $SO_x$ to form the ferric phosphate, ferrous phosphate, manganous phosphate, manganese phosphate, manganese iron phosphate, or combinations thereof and the lithium sulfate; and mixing the lithium sulfate with a solvent to form the first solution comprising lithium sulfate.

20. The method of claim 1, wherein the first waste and the second waste comprise sodium sulfate.

* * * * *